(12) United States Patent
Garland et al.

(10) Patent No.: US 6,208,762 B1
(45) Date of Patent: Mar. 27, 2001

(54) OPTIMIZED ENHANCEMENT OF DIGITAL IMAGES

(75) Inventors: Harry T. Garland, Los Altos, CA (US); Michael G. Roberts, Waikoloa, HI (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/057,083

(22) Filed: Apr. 8, 1998

(51) Int. Cl.[7] ............................... G06T 5/00; G06T 3/00; G06K 9/54

(52) U.S. Cl. ............................ 382/254; 382/305; 382/307

(58) Field of Search ....................... 382/305, 296, 382/297, 275, 254, 123, 128, 293, 307; 707/104, 2

(56) References Cited

U.S. PATENT DOCUMENTS

| | | | |
|---|---|---|---|
| 4,833,625 | * | 5/1989 | Fisher et al. .......................... 345/439 |
| 5,694,484 | * | 12/1997 | Cottrell et al. ........................ 382/167 |
| 5,740,267 | * | 4/1998 | Escherer et al. ...................... 382/132 |
| 5,835,627 | * | 11/1998 | Higgins et al. ....................... 382/167 |
| 5,838,837 | * | 11/1998 | Hirosawa et al. .................... 382/284 |
| 5,881,178 | * | 3/1999 | Tsykalov et al. ..................... 382/260 |

\* cited by examiner

Primary Examiner—Scott Rogers
(74) Attorney, Agent, or Firm—Fenwick & West LLP

(57) ABSTRACT

A method and system for enhancing a digital image stores the original image and a series of codes describing the manipulations performed on the image. Each time the image is retrieved from an original image archive (110) for viewing on a display (120), corresponding codes are retrieved from an original sequence archive (122). If the codes have previously been optimized, the image processing system (108) applies the optimized codes to the image in order to recreate the enhanced image. If the codes have not been optimized, an optimizer (126) combines and reorders the image enhancement codes in light of certain criteria, including minimizing information loss. A strategy used by the optimizer (126) to minimize information loss separates the codes into sequences and then commutes and combines the codes based on the code types. The optimized codes are applied to the image and produce the image that is displayed on the display (120) and saved in the enhanced image cache memory (114).

30 Claims, 3 Drawing Sheets

OPTIMIZED ENHANCEMENT OF DIGITAL IMAGES

BACKGROUND OF THE INVENTION

1. Field of the Invention

This invention pertains in general to digital image processing and in particular to a method and system for enhancing digital X-ray images.

2. Description of Background Art

Modern X-ray systems digitally capture X-ray images with a solid state sensor plate. The images are typically high resolution, e.g. 2688×2688 pixels, and have thousands of levels of gray scale. The images are usually previewed on a monitor associated with the X-ray system and then stored in an image archive for later retrieval and analysis with a more sophisticated viewing system.

The monitor provides a user with a real-time view of the X-ray image received by the sensor plate. A general preference among radiologists is to have a patient's spine aligned with the vertical axis of the image. In emergency room situations, however, the X-rays must be taken immediately and under desperate circumstances. Accordingly, X-rays are often misaligned with respect to the preferred axis. The real-time view in the monitor can be used by the X-ray system operator to correct this misalignment.

When the X-rays are later retrieved with the more sophisticated viewing system, the doctor or other viewer can re-align or otherwise enhance the image by performing one or more digital image manipulations. These manipulations include, for example, rotating, scaling, thresholding, and filtering. Some of the manipulations are lossless, meaning that all information in the original image is retained after manipulation, while others are lossy, meaning that information about the original image is lost during manipulation.

When a manipulation is performed on an image, the most recent, modified, version of the image is stored in the archive for later retrieval. If multiple lossy digital manipulations are performed on the image, the amount of information lost may become substantial. For example, the digital rotation manipulation is generally lossy and the amount of information lost with each rotation is not dependent on the magnitude of the rotation displacement. In use, a first radiologist in the emergency room may make a hasty rotation of an image. Then, at a later date, a second radiologist may desire a more precise alignment and introduce a second, very small, image rotation. Even though the second rotation involves a small angle, the amount of additional information loss is generally the same as for the first, larger, rotation.

Since each enhanced image becomes the latest enhanced image and displaces the previous enhanced image in the cache, the image stored in the cache progressively deteriorates with each lossy digital manipulation. Since the cached image is the only copy of the image, the information lost through lossy digital manipulation cannot be recovered.

Accordingly, there is a need for an image manipulation and enhancement system that optimizes the order, kind, and number of manipulations performed on an image in order to minimize the amount of deterioration suffered by an image after multiple manipulations.

SUMMARY OF THE INVENTION

The above needs are met by a method and system for enhancing a digital image that stores the original image and a series of codes describing the manipulations performed on the image. Each time the image is retrieved from memory (110) for viewing on a display (120), the codes are applied to the image to regenerate the enhanced image.

Images are preferably stored in an original image archive (110) associated with an image processing system (108). Image enhancement codes, in contrast, are preferably stored in an original sequence archive (122) also associated with the image processing system (108).

When an image not presently being displayed is retrieved from the image processing system (108), the original image is retrieved from the original image archive (110), and the associated original image enhancement code sequence is also retrieved from the original sequence archive (122). The codes are received by an optimizer (126) associated with the image processing system (108). If the image enhancement codes have not been previously optimized, the optimizer (126) combines, changes and reorders the image enhancement codes in light of certain criteria. One criterion is typically minimizing information loss caused by unintentionally lossy image manipulations. Accordingly, the optimizer (126) combines, changes, and reorders the codes to minimize unintentional information loss in the transformation of the original image to the enhanced image.

Once the optimizer (126) has combined, changed and reordered the codes, it stores the optimized code sequence in the alternate sequence cache memory (124), and marks it as "optimized." Image processing system (108) applies the manipulations specified by the optimized codes to the original image and produces an enhanced image. The enhanced image is stored in enhanced image cache (114) and marked as "optimized." The enhanced image (114) is retrieved by the image processing system (108) and displayed on the display (120).

When additional manipulations are applied to the displayed image, an embodiment of the present invention optimizes the codes each time new codes are applied. The new codes are appended to the end of the sequence of codes already stored in both the original sequence archive memory (122) and the alternate sequence caches (124) and the codes in the alternate sequence cache memory (124) are remarked as "not optimized." The optimizer (126) updates the codes in alternate sequence cache memory (124), which are remarked as "optimized." Then the image data in enhanced image cache (114) is updated using the reoptimized codes in alternate sequence cache memory (124), and the updated image is forwarded to the display (120). An alternative embodiment of the present invention applies the added codes to the image data in the enhanced image cache (114) immediately, without optimization of the sub-sequence of newly added codes or the whole sequence.

The optimizer (126) initially uses the mutual independence of certain code types to optimize the codes. Image enhancement codes can describe geometric, palette, or mixed manipulations. Mixed manipulations involve a coupling of geometric and palette transformations, so are neither purely geometric nor purely palette. For example, a palette adjustment that is applied to only a selected portion of an image is a mixed transform. Often, consecutive codes of these three types can be commuted, swapped in the sequence, or merged into a single code for a simple or compound transform, depending on the specifics of the two codes. The optimizer 126 takes advantage of commutation properties to adjust the code sequence in preparation for code merging. Reducing the number of codes in the sequence is generally beneficial to the preservation of information. For example, after processing allowed commutations, consecutive rotation codes are combined into a single rotation equal to the sum of the individual rotations. More generally, consecutive geometric transforms can often be combined into a single compound geometric transform represented by a single geometric code. Likewise, consecutive palette transforms can often be combined into a single compound palette transform represented by a single palette code.

The optimizer (126) may also use heuristics to optimize the codes. Consecutive mixed transforms may be combined, if their coupled processes are mutually compatible, a determination that is made on an individual basis given explicit knowledge of the specific mixed transforms involved. The same restriction holds for combining two consecutive transforms when one is mixed and the other is either pure geometric or pure palette.

DETAILED DESCRIPTION OF THE PREFERRED EMBODIMENTS

Figure 1:
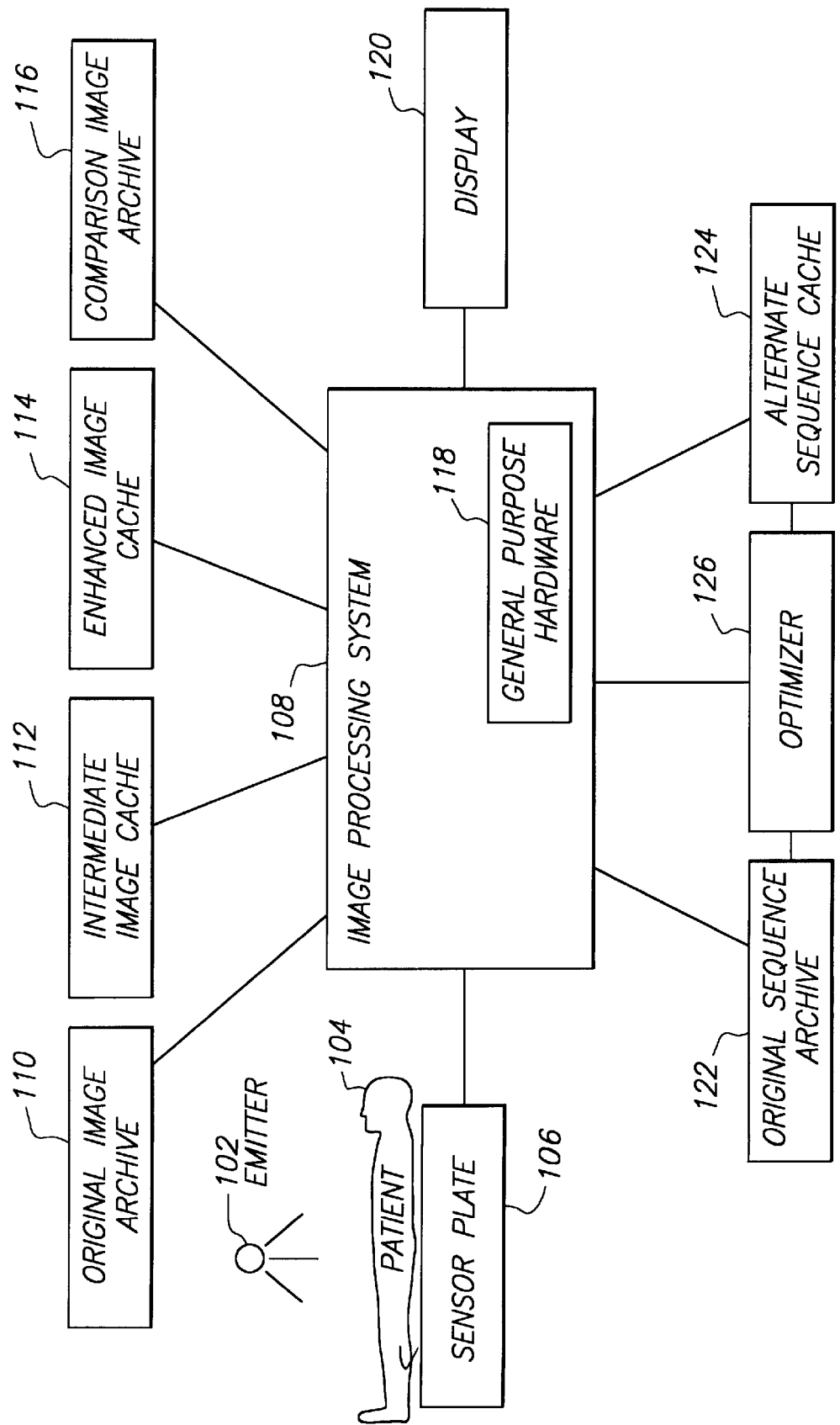
FIG. 1 is a high-level block diagram of a digital X-ray and image processing system according to one embodiment of the present invention.

FIG. 1 is a high-level block diagram of a digital X-ray and image processing system according to one embodiment of the present invention. An emitter 102 emits X-rays which pass through a patient 104 and are captured by a sensor plate 106. The X-ray image is captured digitally and in one embodiment comprises 2688×2688×12-bit (4096 gray scale) pixels.

The X-ray image captured by the sensor plate 106 is transmitted via a network or other communications medium to an image processing system 108. The image processing system 108 preferably includes general purpose computer hardware 118 for performing image manipulation and enhancement according to the present invention. Within the general purpose computer 118 are preferably at least one processor, a memory, a storage device, a keyboard and pointing device, and a graphics adapter. A display 120 is coupled to the graphics adapter.

The at least one processor may be any general-purpose processor such as an INTEL x86 compatible central processing unit (CPU). The storage device may be any device capable of holding large amounts of data, like a hard drive, compact disk read-only memory (CD-ROM), digital versatile disk (DVD), or some form of removable storage device. The memory holds instructions and data used by the processor. The pointing device may be a mouse, track ball, light pen, touch-sensitive display, or other type of pointing device and is used in combination with the keyboard to input data to the image processing system 108. The graphics adapter can display images and other information on the display 120.

A program for performing image manipulation and enhancement according to one embodiment of the present invention is preferably stored on the storage device and executed by the processor from memory. Alternatively, hardware or software modules may be stored within the image processing system 108 for performing functionality described herein.

An original image archive 110, intermediate image cache 112, enhanced image cache 114, comparison image archives 116, original sequence archive 122, alternate sequence cache 124, and optimizer 126 are coupled to the image processing system 108. These devices are preferably implemented using the general purpose computer system 118. For example, the image archives and caches 110, 112, 114, 116 may be implemented within the storage device, the sequence archive 122, 124 and caches may be implemented within the computer system's 118 memory, and the optimizer 126 may be implemented within the CPU. Alternatively, each of these devices may be implemented as separate hardware coupled to the image processing system 108.

When an image is received from the sensor plate 106, the image processing system 108 stores the image in the original image archive 110. The original image archive 110 always holds the original, unmodified image captured by the sensor plate 106. The image may then be retrieved from the original image archive 110 and displayed on the display 120 in order to view or manipulate the image. By using the keyboard and/or pointing device, a user can apply various manipulations to the displayed image or a portion of the image.

When a modification is applied to an image, the image processing system 108 generates one or more image enhancement codes describing the modification. These codes are preferably stored in the original sequence archive 122 in the order in which the codes were applied. Alternatively, the codes may be stored in the original image archive 110 along with the original image or elsewhere within the image processing system 108. In a preferred embodiment of the present invention, the codes form a single simple sequence. In an alternative embodiment of the present invention, the codes form a network of branching, parallel, and joining paths leading from the original image to the fully modified image. In either case, the codes are referred to herein as a sequence.

Figure 2:
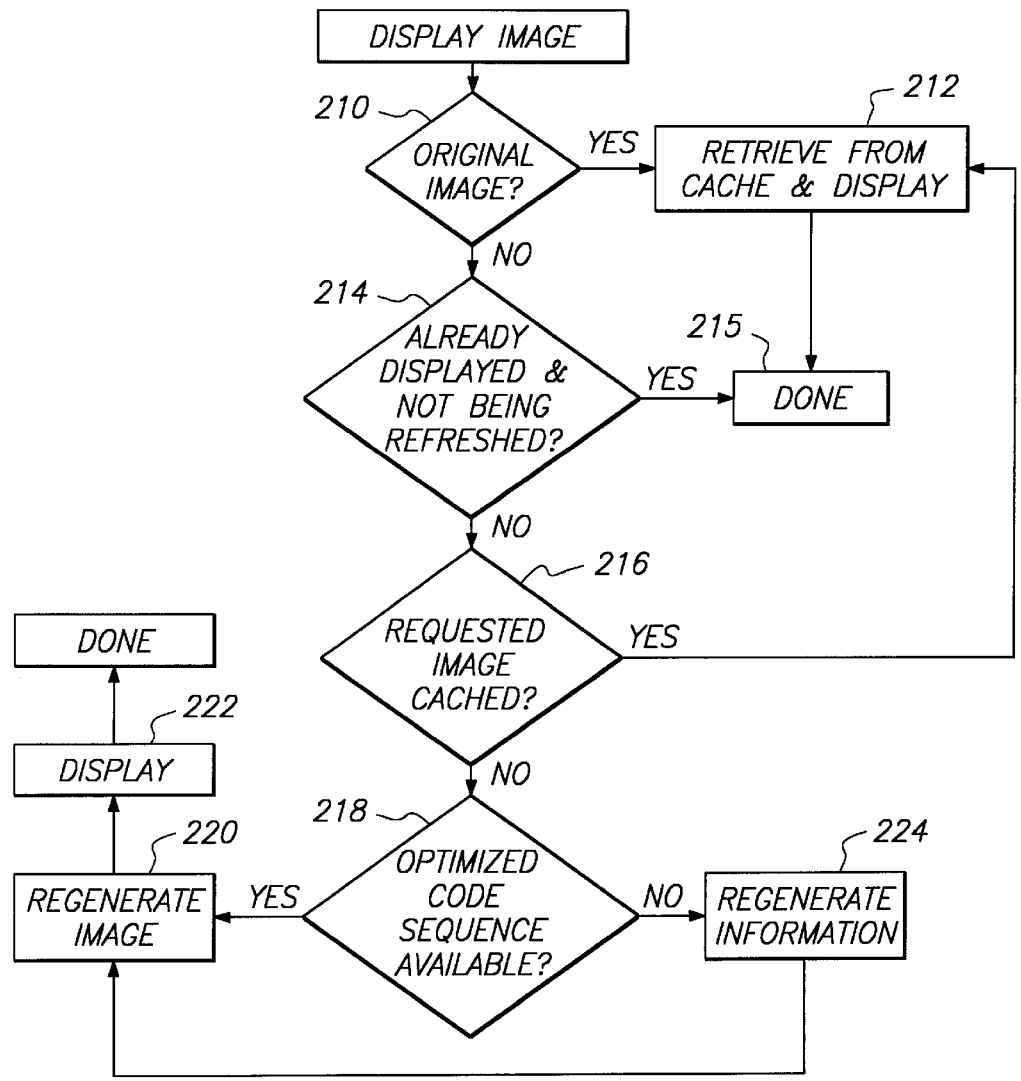
FIG. 2 is a flow chart illustrating steps for retrieving and displaying an image according to an embodiment of the present invention.

FIG. 2 illustrates steps performed by one embodiment of the present invention when a user instructs the image processing system 108 to display an image on the display 120. To optimize performance, the image processing system 108 checks the various caches to determine whether image processing has already been completed, is still stored and available, and so need not be redone. However, the user may instruct that an enhanced image be partially refreshed, or completely regenerated. Once the enhanced image is displayed as requested, the image processing system 108 may launch a background process to bring all cache memories involved up to date with that image by invoking appropriate portions of the tasks detailed below.

If the user specifically requests to view an original image 210, without any enhancing modifications, then image processing system 108 retrieves the image from original image archive 110 and sends the image to the display 120 212. Otherwise, the image processing system 108 presumes that the user is requesting to view the fully enhanced version of the image. In certain embodiments, the user may request to view the image as partially processed by a user-specified subsequence of the previously stored enhancing modification code sequence. The remainder of this description presumes that unless otherwise specified, a request for an image is a request for a fully enhanced image.

If the requested image is already being shown on the display 120 214, the image processing system 108 is finished 215. If the user has requested that the image on the display 120 be refreshed, then the image processing system 108 queries the enhanced image cache 114 to determine if the image is available there 216, and if it is, the image is shown on the display 120 212. In certain embodiments of the present invention, an enhanced image may be archived with the original image data in original image archive 110. In that case, if such an enhanced image is available, and if it is marked "optimized," the enhanced image is copied to enhanced image cache 114, and shown on the display 120. In alternative embodiments, a user request for an image refresh will bypass these steps.

If the enhanced image is not directly available, the image processing system 108 queries the alternate sequence cache memory 124 to determine if it contains an enhancement code sequence for that image 218, and if that sequence is marked "optimized." If so, then the image may be regenerated 220 from the original image retrieved from original image archive 110, by re-application of the optimal codes in alternate sequence cache memory 124 and displayed 222. In certain embodiments, an optimized enhancement code sequence may be archived with the original enhancement code sequence data in original sequence archive 122. In that case, if such an optimized enhancement code sequence is available, and if it is marked "optimized," that optimized enhancement code sequence is copied to alternate sequence cache memory 124, and the enhanced image is re-generated and displayed. In alternative embodiments, a user request for an image refresh will bypass these steps.

If the optimized code sequence is not directly available, a preferred embodiment of the image processing system 208 refreshes, recalculates and regenerates all non-original data and images in all memories described above 224. Alternatively, the image processing system 208 fills only those memories that need filling, as described above. The original image is recalled from the original image archive 110, and the associated codes are also retrieved from the original sequence archive 122. In a preferred embodiment of the present invention, the two archives 110 and 122 are coordinated such that images are associated with their respective enhancement codes. In an alternative embodiment of the present invention, the two archives 110 and 122 are implemented as a single unit so that the coordination is innate in the design. Both the original image and the original code sequence are sent to the optimizer 126.

If the sequence retrieved from the original sequence archive 122 is marked as "optimized," then that optimized sequence data may be loaded into the alternate sequence cache memory 124. Otherwise, the memory slot in the alternate sequence cache memory 124 that is associated with the processing of the original code sequence is cleared. In certain embodiments, the alternate sequence cache memory 124 may be comprised of a multiplicity of individual caches, which may be used by the optimizer 126 in the evaluation of alternative code sequences.

If the data retrieved from the original image archive 110 also includes the enhanced image, and it is marked as "optimized," then that image data is loaded into enhanced image cache 114, and that image is sent directly to display 120. Otherwise, the memory slot in the enhanced image cache 114 that is associated with the processing of the original image is cleared. In certain embodiments, the enhanced image cache 114 may be comprised of a multiplicity of individual caches, which may be used by the optimizer 126 in the evaluation of alternative code sequences.

The optimizer 126 examines the image enhancement codes in the original sequence archive 122 and determines whether the codes have been previously optimized. If not, the optimizer 126 combines, changes and re-orders the original codes into an alternate code sequence determined to maximize some desired result when the alternate code sequence is applied to the original image.

When the optimizer 126 completes its generation of the optimal code sequence, it stores the enhancement codes in the alternate sequence cache memory 124 and marks them as "optimized." In certain embodiments, the latest optimized enhancement code sequences may be archived with the original enhancement code sequence data in the original sequence archive 122. That action avoids the need to optimize the codes the next time the image is retrieved from image processing system 108, provided that the original or optimized enhancement codes have not been subsequently altered.

Once the optimal code sequence is found, or if the codes were previously optimized, the image processing system 108 applies the codes to the image retrieved from the original image archive 110 220. In an embodiment of the present invention, intermediate images generated during this processing are stored in one or more intermediate image caches 112. An alternative embodiment of the present invention uses the enhanced image cache 114 for temporary storage of intermediate image data, as well as the final result image. Another alternative embodiment of the present invention uses one or more intermediate image caches 112 for implementing parallel processing paths within the general flow of the processing of an image. If the enhancement codes indicate processing involving predefined reference images, those images may be stored in comparison image archives 116.

The resulting, enhanced image is provided to the image processing system 108 for storage in enhanced image cache 114 and marked as "optimized." In certain embodiments, the latest enhanced image may be archived with the original image data in original image archive 110, thereby avoiding the need to process the original image the next time the image is retrieved from image processing system 108, provided that the original or optimized enhancement codes have not been subsequently altered. In all cases, the enhanced image 114 is retrieved by the image processing system 108 and displayed on the display 120.

When additional new manipulations are applied to the displayed image, the new codes are appended to the end of the corresponding sequence of codes already stored in both the original sequence archive memory 122 and the alternate sequence cache 124. In addition, the codes in the alternate sequence cache 124 are remarked as "not optimized."

Then the image data in enhanced image cache 114 is updated. In a preferred embodiment of the present invention, this updating is done by first re-optimizing the new overall sequence in original sequence archive 122, in which case the resulting optimal code sequence and enhanced image are each marked as "optimized." In an alternative embodiment of the present invention, the image update may be selected by the user to be immediate, based on the added manipulations and without complete optimization of the overall enhancement code sequence, in which case the resulting image is marked as "not optimized." In certain embodiments, an added sub-sequence may be optimized within itself, without regard to the rest of the sequence to which it is appended.

In some embodiments the resulting enhanced image in the enhanced image cache 114 is then archived with the original image data in original image archive 110, and the state of the enhanced image in that archive is remarked as either "optimized" or "not optimized" accordingly. In some embodiments the contents of the alternative sequence cache memory 124 are then archived with the original enhancement code sequence data in original sequence archive 122, and the state of the alternate code sequence in that archive is remarked as either "optimized" or "not optimized" accordingly.

As described above, the optimizer 126 optimizes sequences of image enhancement codes. Manipulations that can be performed on the source image are generally classified according to transform type as geometric, palette, or mixed. Geometric transforms affect the relative location of image pixel data between the source and result image planes. Palette transforms affect the relative grayscale intensity or color of pixel data between the source and result image planes. Geometric and palette transforms are pure types. Mixed manipulations involve a coupling of geometric and palette transformations, so are neither purely geometric nor purely palette. Consecutive sequential codes of these three types can often be commuted, swap position in the sequence, or be merged into a single code for a simple or compound transform, depending on the specifics of the two codes. The optimizer 126 takes advantage of these properties to optimize the code sequence.

Simple geometric manipulations supported by a preferred embodiment of the present invention include translation, rotation, scaling, and mirroring. Translating moves the viewing frame of reference for an image a predetermined distance in the x and/or y direction. Rotating adjusts the angle of the viewing frame for an image a predetermined number of degrees about a selected axis point in the image. Scaling zooms the viewing frame for an image by a number of times in the x and/or y direction. Mirroring involves "flipping" the image through some specified straight line in the image plane. In cases where the original image data is three-dimensional, the manipulations described herein naturally assume their three-dimensional forms.

Complex geometric manipulations supported by a preferred embodiment of the present invention may be generally denoted as "non-uniform" stretching, though they may involve any manner of piecewise translation, rotation, scaling, mirroring, cutting and pasting, or other geometric operations. Non-uniform manipulations are those that are not applied uniformly across the portion of the plane in which the source image lies. A non-uniform geometric manipulation, for example, may stretch the flexible boundaries of the viewing frame, as well as any conceptual grid lines on the "fabric" of that frame, into warped shapes, with respect to the presumed rectalinear plane of the source image on which it acts. In the resulting image plane, the viewing frame and fabric of the previously applied transform is always rectalinear.

Palette manipulations supported by a preferred embodiment of the present invention include grayscale thresholding, dynamic range adjustment, brightness adjustment, gamma correction, and contrast adjustment. Grayscale thresholding reduces the number of grayscale levels in an image by mapping multiple levels in the original image to a single level in the enhanced image. Dynamic range adjustment compresses or expands the range of palette values used in the result image relative to the source image. Brightness adjustment is a translation of palette values toward values of greater or lesser intensity, generally without changing the dynamic range of the overall palette. Gamma correcting adjusts the gamma, or degree of contrast, in an image. Similarly, contrast adjusting changes the contrast levels of the image.

Mixed manipulations supported by a preferred embodiment of the present invention include size filtering, and any palette adjustment made to a limited extent of the image plane not including all of the source image for that manipulation. Size filtering removes tiny aberrations in the X-ray image by deleting all imaged objects below a certain size. That removal may be achieved by smoothing the region of the deleted image portion to fit the values and trends of the surrounding image area. Geometrically limited palette manipulations include adjustment of contrast in a portion of the source image, removal of selected image features, and other such user-directed manipulations common to the art of image processing.

In addition, the geometric, palette, and mixed manipulations are either lossy or lossless. Lossy manipulations are those in which information in the source image is lost when the manipulation is applied to that image. Accordingly, the original image cannot be completely reconstructed from the manipulated image. Lossless manipulations, in contrast, are those in which all information in the source image is preserved after the manipulation. Since all information is preserved, the image can be completely reconstructed from the manipulated image.

For example, an integer-scale zoom operation without interpolation is lossless because it always maintains the original pixel structure. Each original pixel is simply multiplied into many identical pixels at a new location in the enhanced image. Since the original unzoomed image is easily recoverable from the zoomed image, the zooming process is lossless. If, however, the zooming includes interpolation, then irreversible information loss occurs because it is impossible to determine what "portion" of the combined data in the interpolated zoomed pixels corresponds to unzoomed pixels in the original image.

Similarly, a contrast adjust operation may be lossy or lossless. The operation may map two different contrast levels in the original image to the same level in the enhanced image, which results in an irreversible lossy transformation. On the other hand, each level in the original image may map to a unique level in the enhanced image. No information has been lost if the latter mapping is the case, so it is possible to reconstruct the original image from the source simply by mapping each enhanced level back to its corresponding original level.

Some lossy image enhancements may be said to "intentionally" discard information. For example, a digital smoothing transform irreversibly distorts the image, blending source image pixel data to yield result image pixel data. A user invoking a smoothing transform is presumed to understand and accept that information loss is an intended result of its application. Other lossy image enhancement codes may be said to "unintentionally" discard information. In general, a digital rotation transform irreversibly interpolates source image pixel data to yield result image pixel data. A user invoking a rotation transform, however, might or might not desire the information loss that is a side effect of its application.

Other codes represent digital image transforms that preserve information. For example, a digital scaling transform with a positive integer zoom factor reversibly maps source image pixel data to yield result image pixel data. The user may or may not desire that the information preserving property of such a transform to be preserved by optimization.

In a preferred embodiment of the present invention, users are presumed to desire information loss only when using transforms that intentionally discard information. In that case, an optimization based on information measures may examine alternatives for codes of unintentionally lossy transforms such as rotations. An alternative embodiment of the present invention allows users to indicate that certain information loss is intentional.

While the user may implicitly value the preservation of information, some other goal may be deemed more important. For example, a user may wish to detect lesions by visual examination of the enhanced X-ray images. Accordingly, the action of the optimizer 126 to preserve information content may be turned off. Alternatively, codes may be marked so that the optimizer does not change their positions within the overall sequence or their parametric definitions. Fortunately, such actions need not be taken in most cases, since the goal of preserving information and other typical goals such as detecting lesions in the enhanced images are typically different but not incompatible.

In the present invention, it is possible to conditionally optimize with respect to two or more different goals. Multiple goals are possible where one goal, e.g., maximizing preservation of original image information in the enhanced image, is not completely at odds with another goal, e.g., enhancing visibility of lesions. In such cases, the nature of the overall system as an image modification device with immediate visual feedback can be utilized. In a preferred embodiment of the present invention, image modifications are updated immediately, with implicit optimization, as the user requests them to be made. In such an environment, the user is provided with immediate visual feedback by which the user may judge the efficacy of the result, including the effects of continual optimization.

Suppose that the optimizer 126 is instructed to maximize the preservation of original image information in the result image. Suppose further that the optimization slightly degrades the effect of the enhancements that were selected by the user to achieve some expected result for the requested modifications, such as reducing an expected smoothing. The user is free to invoke other additional modifications to achieve the desired result, including codes with intentional information loss characteristics, such as outright smoothing. Hence, the optimizer 126 takes responsibility for preserving information, while the user takes responsibility for selecting conditionally appropriate image modifications to enhance lesion visibility. Since the two goals are not diametrically opposed, the user has sufficient freedom to achieve acceptable lesion enhancement under the limitations imposed by ongoing information optimization. This allows the preferred embodiment to be tuned to the optimization of information preservation with negligible negative impact on its ability to perform other duties, such as lesion enhancement.

A typical acceptable methodology for the optimizer 126 is to make analytic comparisons of code sub-sequences as if they were conducted in an entirely analog environment, rather than the digital environment of the present invention. The attraction of the analog environment is that some transforms that unintentionally discard information in the digital domain do not do so in the analog domain where spatial and intensity resolution are not inherently limited. The motivation and theoretical foundation of the analog analysis is provided by the Sampling Theorem, although that formalism is not actually invoked in the embodiments of this invention.

The simplicity of the analog domain, then, is that it allows the code sequence to be changed without consideration of the consequences of distortions inherent only in the digital domain. The optimizer is thus free to compact the sequence, so long as it adheres to analytic principles of the analog domain, which are generally much easier to deal with than those of the digital domain. The basic theme of the optimization process is that reducing the number of codes in the sequence is generally beneficial to the preservation of information.

An alternative methodology for the optimizer 126 is to use digital techniques that preserve or ignore all the information aspects of the original code sequence, even unintentional information loss. Such methods are typically used when the preservation of information is not the highest priority of the optimization process and are provided to allow the user to control the extent to which the optimizer 126 preserves information.

The desired result of the optimizer 126 is typically minimizing unintentional information loss while still achieving the intended end result of the original overall transform code sequence. In this case, the optimizer 126 uses a set of steps to completely process the original enhancement code sequence stored in original sequence archive 122. In some embodiments of the present invention, the number of steps may be greater or fewer than the number of steps in this description. For example, an individual step may be efficiently implemented as more than one distinct step, or more than one step may be combined into a single step. It should also be clear that the steps described herein may be performed in a different order, as long as the underlying mathematical principals are followed. In addition, the steps described herein can be applied to any portion of an image, down to the level of the individual pixel in the result image, for which a specific enhancement code sequence may be defined that may be different from those defined for other such pixels.

Figure 3:
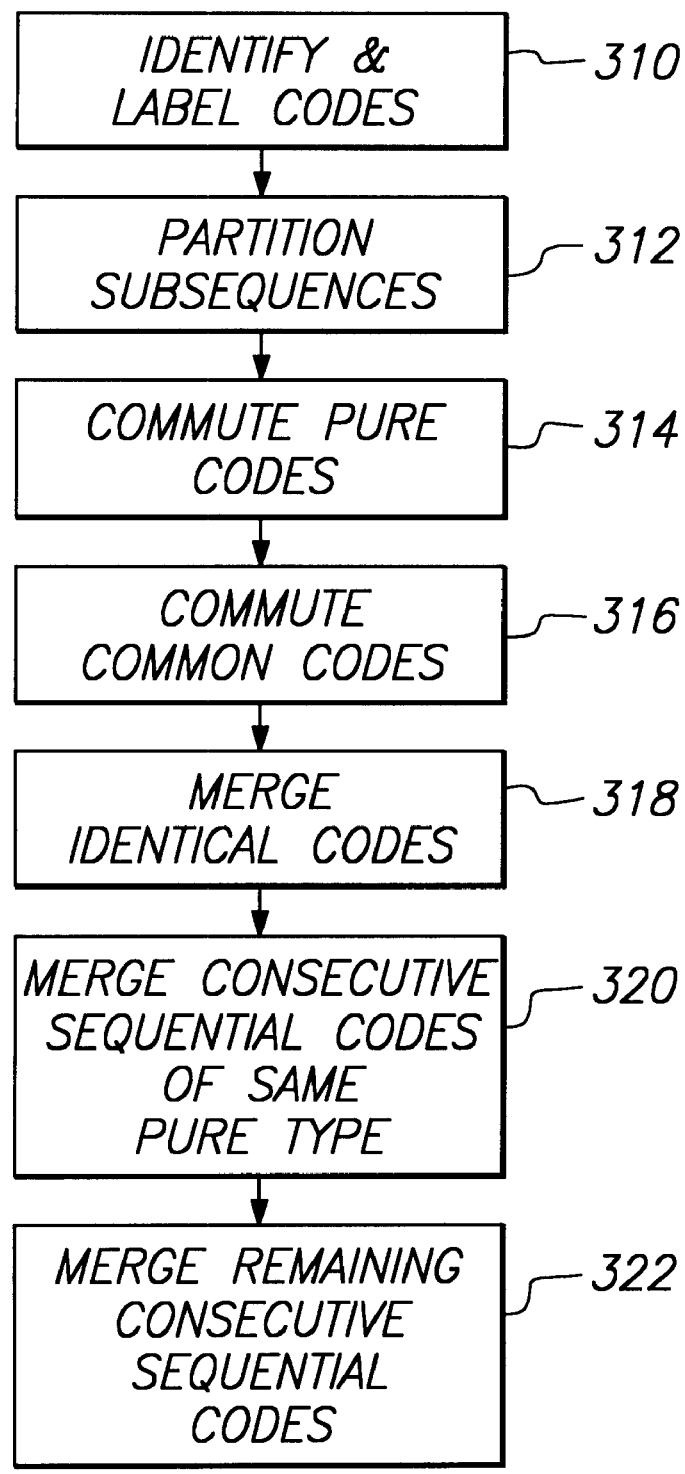
FIG. 3 is a flow chart illustrating steps for optimizing image enhancement codes according to an embodiment of the present invention.

FIG. 3 is a flow chart illustrating the steps for optimizing enhancement codes according to a preferred embodiment of the present invention. First, one of the following primary type labels is attached to each enhancement code, depending on its associated transform: pure geometric, pure palette, or mixed 310. In a preferred embodiment, one of the following secondary type labels is also attached: lossless, unintentionally lossy, or intentionally lossy. The distinguishing characteristics of unintentional lossy versus intentional lossy may depend on user supplied parameters. The optimizer 126 also notes which codes and code subsequences are optionally deemed by the user to be inviolate from the optimization process. Accordingly, the user can optionally instruct the optimizer 126 to preserve some or all of the lossy characteristics of the original sequence.

Next the optimizer 126 locates codes of mixed primary type 312. Individual or consecutive runs of such mixed codes are considered to act as delimiters, defining subsequences of other codes that are not of mixed primary type. This partitions the overall sequence of codes into subsequences of zero or more pure geometric and/or palette operations, each separated by one or more mixed manipulations.

The resulting partition of pure geometric and/or palette codes delimited by mixed codes is useful because it defines natural barriers against the most straightforward strategies for commutation of consecutive codes. Within each subsequence of geometric and/or palette codes, code pairs comprised of consecutive codes where one code is pure geometric and the other is pure palette are located 314. Such primary pure cross-type code pairs are special. Pure geometric and palette manipulations are mutually independent and hence relatively commutative, meaning that the order in which two consecutive sequential manipulations, one of which is pure geometric and the other is pure palette, are performed has no effect on the resulting image. Hence cross-type commutation is allowed between pure geometric and palette codes. Pure cross-type commutation may be used to migrate pure type codes within a single sub-sequence into two pure group sub-sequences, one group of zero or more pure geometric codes, the other group of zero or more pure palette codes. At this point in the processing, the relative order of codes within each pure group sub-sequence is the same as in the original sequence.

Although pure geometric and palette manipulations are mutually independent and hence relatively commutative, the same cannot be said for two pure geometric or two pure palette manipulations, which cannot in general be commuted with negligible effect on the resulting image and its information content. For example, a translation followed by a rotation is generally not the same as a rotation followed by a translation.

However, two pure manipulations of the same type can be commuted, if they are suitably altered to preserve the original result. For example, a translation followed by a rotation can be changed to a rotation followed by a translation, provided that that translation is changed to go along the line that it would have gone after the original rotation. Such common pure type commutations are performed, to form sub-groups of identical transforms, changing some codes as necessary to preserve the intent of the original code sequence 316. Each pure group within a sub-sequence is thus rearranged so that pure codes for the same transform are mutually consecutive. For example, all rotation codes within a geometric group sub-sequence are migrated together into a sub-group; all codes in the identical transform sub-group are for the same transform: rotation.

Such procedures may have subtle consequences on the result image. For example, the distortion of the result image effected by a translation that comprises a non-integer displacement in pixels, followed by a rotation other than by increments of 90 degrees, may differ from the distortion introduced by the reversed and corrected code order. If the user has optionally instructed that the specific information loss resulting from the original distortion is not to be altered by optimization, then that particular commutation and correction is not done. However, in other cases, the change in distortion is usually smaller than the savings in distortion offered by the optimization process, so this small second-order effect, a distortion of a distortion, is usually deemed acceptable.

Then, identical consecutive transforms within identical transform sub-groups are merged 318. Consecutive geometric or palette manipulations within each group sub-sequence describing the same manipulation transform are combined. This step tends to recover information in the original image that was unintentionally lost by the original enhancement code sequence. However, the expressed desire of the user must be taken into account, with respect to the distinction between unintentional and intentional information loss.

For example, all consecutive rotation codes within a geometric subsequence are combined into a single rotation equal to the sum of the individual rotations. At this point in the processing, the identical transform sub-groups have generally been replaced by individual codes, so that each pure group sub-sequence contains at most one code corresponding to any particular transform. This will not hold where the user has elected to preserve some or all of the lossy characteristics of the original sequence.

Next, consecutive sequential codes of each pure group sub-sequence are merged into complex transforms of a common type 320. For example, an instance of a rotation code followed by a translation code is combined into a single compound geometric code that represents the result of taking each action separately in order. More generally, consecutive geometric transforms may be combined into a single compound geometric transform represented by a single geometric code. Likewise, consecutive palette transforms may be combined into a single compound palette transform represented by a single palette code. Again, this process is constrained by expressed desire of the user with respect to the distinction between unintentional and intentional information loss. At this point in the processing, the partly optimized sequence may be considered to be defined by its delimiting mixed codes, consecutive runs of which are separated by, and the whole surrounded by, zero or one geometric codes and zero or one palette codes. This will not hold where the user has elected to preserve some or all of the lossy characteristics of the original sequence.

Then remaining consecutive sequential codes, irrespective of type, are merged as much as possible to reduce the sequence to as short a length as feasible 322. This step involves the formation of compound mixed codes and the specific techniques employed in this step are dependent on the specific codes being commuted or merged. This step marks the advent of heuristics in the optimization process and allows for customization of the optimization process. Support for the customization is provided by an extensible pattern matching capability that invokes user supplied algorithms operating on the optimizing sequence of enhancement codes. In a preferred embodiment of the present invention, the extensible pattern matching capability is based on the techniques described in U.S. Pat. No. 5,606,690, entitled NON-LITERAL TEXTUAL SEARCH USING FUZZY FINITE NON-DETERMINISTIC AUTOMATA, U.S. patent application Ser. No. 08/537,314, entitled SELECTIVE DOCUMENT RETRIEVAL METHOD AND SYSTEM, which was filed on Sep. 29, 1995, and U.S. patent application Ser. No. 08/918,503, entitled NON-LITERAL TEXTUAL SEARCH USING FUZZY FINITE-STATE LINEAR NON-DETERMINISTIC AUTOMATA, which was filed on Aug. 22, 1997, all of which are hereby incorporated by reference herein. As above, this process is constrained by expressed desire of the user with respect to the distinction between unintentional and intentional information loss. At this point in the processing, the sequence is optimally compacted.

Returning to FIG. 2, the enhancement codes in the selected order are applied to the original image 220. Then, the enhanced image is displayed on the display 120 222.

An advantage of using enhancement codes as described herein is that an enhancement operation can be "undone" by merely removing the associated codes from the original sequence archive 122. The image processing system 108 can be configured to reorder the codes and regenerate the enhanced image each time an enhancement is undone. Alternatively, the image processing system can merely drop the associated codes from the code sequence.

In summary, the present invention provides optimal enhancement of digitized images. Through the use of image enhancement codes, the information loss caused by multiple lossy manipulations is minimized. Moreover, the effects of lossy enhancements can be reversed by reverting back to the original image.

The above description is intended to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. An image processing system for enhancing a digital image, the image processing system comprising:
   an image archive for storing the digital image;
   a sequence archive for storing image enhancement codes each describing a type of enhancement to be performed on the digital image; and
   an optimizer coupled to the image archive and the sequence archive for altering an order in which the image enhancement codes in the sequence archive are applied to the digital image, for merging selected ones of the image enhancement codes to be applied to the digital image, and for applying the altered and merged image enhancement codes to the digital image in the image archive to create an optimal enhanced digital image.

2. The image processing system of claim 1, further comprising:
   an alternate sequence cache for storing the altered and merged image enhancement codes produced by the optimizer.

3. The image processing system of claim 1, further comprising:
   an enhanced image cache for storing the enhanced digital image produced by the optimizer;
   wherein responsive to receipt of a request to display the enhanced digital image, the image processing system displays the enhanced digital image in the enhanced image cache if the image is cached.

4. The image processing system of claim 1, wherein an optimal enhanced image has minimal information loss.

5. A method of enhancing an unmodified image stored in a memory of a computer system having a processor, the method comprising the steps of:
   receiving image enhancement codes from the memory, each image enhancement code describing an image enhancement manipulation to be performed on the image;
   altering an order in which the image enhancement codes are applied to the unmodified image to optimize the image enhancement;
   merging selected ones of the image enhancement codes to be applied to the unmodified image to optimize the image enhancement;
   receiving the unmodified image from the memory; and
   applying, using the processor, the image enhancement codes to the unmodified image to produce an enhanced image.

6. The method of claim 5, further comprising the step of:
   storing the unmodified image and the image enhancement codes to the memory.

7. The method of claim 5, further comprising the step of:
   selectively deleting ones of the image enhancement codes stored in the memory.

8. The method of claim 5 further comprising the step of:
   changing an image enhancement manipulation specified by an image enhancement code responsive to the altered order of the codes.

9. The method of claim 5, wherein the merging step further comprises the substeps of:
   dividing the image enhancement codes into at least one code sequence; and
   combining selected ones of the image enhancement codes within the at least one code sequence.

10. The method of claim 5, wherein the desired enhancement is minimizing information loss in the enhanced image.

11. The method of claim 5, further comprising the steps of:
    storing recently-generated enhanced images to an enhanced image cache in the memory; and
    responsive to a request to display the enhanced image, displaying the enhanced image when it is cached within the enhanced image cache.

12. A computer-readable medium having computer-executable instructions stored thereon for displaying an image stored in the memory of a computer system, the instructions comprising:
    instructions for receiving a request to display an enhanced version of the image;
    instructions for retrieving, responsive to the received request to display the enhanced version of the image, a plurality of image enhancement codes from the memory, each image enhancement code describing an enhancement to be performed on the image;
    instructions for altering an order in which the image enhancement codes are applied to the image to achieve a desired optimization of the enhancement;
    instructions for merging selected ones of the image enhancement codes to achieve a desired optimization of the enhancement; and
    instructions for applying the altered and merged image enhancement codes to the digital image to produce the enhanced version of the image.

13. The computer-readable medium of claim 12, further comprising:
    instructions for storing the enhanced version of the image to an enhanced image cache in the memory; and
    instructions for displaying the enhanced version of the image stored in the enhanced image cache whenever it is encached when the request to display the enhanced version of the image is received.

14. The computer-readable medium of claim 12, further comprising:
    instructions for selectively deleting ones of the image enhancement codes.

15. The computer-readable medium of claim 12, wherein the instructions for altering the order in which the image enhancement codes are applied to the image comprise:
    instructions for identifying operations performed by each of the image enhancement codes;
    instructions for ordering the image enhancement codes based upon the operations performed by each of the image enhancement codes; and
    instructions for modifying the operations performed by selected ones of the image enhancement codes responsive to the code order.

16. The computer-readable medium of claim 15, wherein the instructions for identifying operations performed by each of the image enhancement codes further comprise:
    instructions for identifying an operation performed by an image enhancement code as a type selected from: lossless, intentionally lossy, and unintentionally lossy.

17. The computer-readable medium of claim 15, wherein the instructions for identifying operations performed by each of the image enhancement codes further comprise:

instructions for identifying an operation performed by an image enhancement code as a type selected from: pure palette, pure geometric, and mixed types.

18. The computer-readable medium of claim 17, wherein the instructions for altering an order in which the image enhancement codes are applied to the image alters the order responsive to whether particular image enhancement codes are identified as pure palette, pure geometric, or mixed and wherein the instructions for merging selected ones of the image enhancement codes merges the codes responsive to whether particular image enhancement codes are identified as pure palette, pure geometric, or mixed.

19. The computer-readable memory of claim 12, wherein the instructions for altering the retrieved image enhancement codes comprise:

instructions for analyzing the image enhancement codes as if the image enhancement codes operated in the analog domain.

20. The computer-readable medium of claim 12, wherein the instructions for merging selected ones of the image enhancement codes comprise:

instructions for merging selected ones of the image enhancement codes based upon the operations performed by each of the image enhancement codes.

21. The computer-readable medium of claim 12, wherein the desired optimization minimizes information loss in the enhanced version of the image.

22. An image processing system for storing and enhancing digital images, the image processing system comprising:

an original image archive for storing a plurality of digital images;

an original sequence archive for storing sequences of image enhancement codes for operating on associated ones of the plurality of digital images stored in the original image archive;

an optimizer coupled to the original image archive and the original sequence archive for optimizing the image enhancement codes to produce optimized image enhancement codes for operating on associated ones of the plurality of digital images stored in the original image archive;

an alternate sequence cache coupled to the optimizer for storing optimized image enhancement codes produced by the optimizer;

an image processor coupled to the optimizer for applying optimized image enhancement codes stored in the alternate sequence cache to the associated digital images to produce enhanced images; and an enhanced image cache coupled to the image processor for storing the enhanced images produced by the image processor.

23. The image processing system of claim 22, further comprising:

a module for accepting new image enhancement codes for enhancing a digital image stored in the original image cache; and a module for appending the new image enhancement codes to the image enhancement codes in the alternate sequence cache associated with the image stored in the original image cache.

24. The image processing system of claim 23, further comprising:

a module for identifying images in the enhanced image cache and optimized image enhancement codes stored in the alternate sequence cache as "optimized" or "not optimized" responsive to the acceptance of new image enhancement codes for the digital image.

25. The image processing system of claim 22, wherein the optimized image enhancement codes minimize information loss in the enhanced images.

26. A method of optimizing a sequence of enhancement codes describing enhancements to be performed on a digital image, comprising the steps of:

assigning a type to each enhancement code in the sequence;

partitioning the sequence into sub-sequences delineated by enhancement codes of a first type;

commuting pairs of enhancement codes within each sub-sequence, wherein a first code in a pair is of a second type and a second code in a pair is of a third type, to produce two groups of enhancement codes within each sub-sequence; and merging selected enhancement codes within each group within each sub-sequence.

27. The method of claim 26, wherein each enhancement code performs a transform and further comprising the step of:

commuting pairs of enhancement codes within each group responsive to the transforms performed by the enhancement codes so that each group contains consecutive codes performing identical transforms.

28. The method of claim 26, further comprising the step of:

altering the transforms performed by particular enhancement codes within each group to preserve an original result of the sequence of enhancement codes.

29. The method of claim 26, wherein the first type is mixed transforms.

30. The method of claim 29, wherein the second type is pure geometric transforms and the third type is pure palette transforms.

* * * * *